United States Patent
Kim et al.

(10) Patent No.: US 10,916,754 B2
(45) Date of Patent: Feb. 9, 2021

(54) SEPARATOR HAVING POROUS COATING LAYER, METHOD FOR MANUFACTURING THE SAME AND ELECTROCHEMICAL DEVICE HAVING THE SAME

(71) Applicants: LG Chem, Ltd., Seoul (KR); Toray Industries, Inc., Tokyo (JP)

(72) Inventors: Jong-Hun Kim, Daejeon (KR); Sang-Young Lee, Daejeon (KR); Pil-Kyu Park, Daejeon (KR); Jang-Hyuk Hong, Daejeon (KR); Byoung-Jin Shin, Daejeon (KR); In-Chul Kim, Daejeon (KR)

(73) Assignees: LG Chem, Ltd., Seoul (KR); Toray Industries, Inc., Tokyo (JP)

(*) Notice: Subject to any disclaimer, the term of this patent is extended or adjusted under 35 U.S.C. 154(b) by 616 days.

(21) Appl. No.: 14/840,875

(22) Filed: Aug. 31, 2015

(65) Prior Publication Data
US 2016/0056438 A1    Feb. 25, 2016

Related U.S. Application Data

(63) Continuation of application No. 12/745,414, filed as application No. PCT/KR2008/006944 on Nov. 25, 2008, now abandoned.

(30) Foreign Application Priority Data

Nov. 29, 2007 (KR) .................... 10-2007-0122965
Oct. 2, 2008 (KR) .................... 10-2008-0097364

(51) Int. Cl.
*H01M 2/16* (2006.01)
*H01M 2/14* (2006.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
CPC .............. H01M 2/14–185; H01M 10/02–0587
See application file for complete search history.

(56) References Cited

U.S. PATENT DOCUMENTS 3,953,241 A  4/1976 Langer et al.
3,967,978 A  7/1976 Honda et al.
(Continued)

FOREIGN PATENT DOCUMENTS

EP  1 826 842 A1  8/2007
EP  1 365 461 B1  7/2010
(Continued)

*Primary Examiner* — Jonathan Crepeau
*Assistant Examiner* — Jacob Buchanan
(74) *Attorney, Agent, or Firm* — Morgan, Lewis & Bockius LLP

(57) ABSTRACT

A separator includes a porous substrate having a plurality of pores; and a porous coating layer formed on at least one surface of the porous substrate and made of a mixture of a binder and a plurality of inorganic particles, wherein the binder includes a crosslinked binder. This separator may improve high temperature cycle performance, discharge characteristics and thermal resistance of an electrochemical device since the separator exhibits improved insolubility and impregnation to electrolyte and improved thermal resistance.

2 Claims, 2 Drawing Sheets

(51) Int. Cl.
  *H01M 10/0525*  (2010.01)
  *H01M 10/0583*  (2010.01)
  *H01M 10/052*  (2010.01)

(52) U.S. Cl.
  CPC ..... *H01M 2/1653* (2013.01); *H01M 10/0525* (2013.01); *H01M 10/0583* (2013.01); *H01M 10/052* (2013.01)

(56) References Cited

U.S. PATENT DOCUMENTS

| | | | | |
|---|---|---|---|---|
| 5,429,891 | A | * | 7/1995 | Gozdz ................. C08J 9/28 429/231.95 |
| 6,096,456 | A | * | 8/2000 | Takeuchi ............. H01G 9/02 429/249 |
| 6,420,072 | B1 | * | 7/2002 | Maruyama ......... C08F 220/48 252/62.2 |
| 6,632,561 | B1 | | 10/2003 | Bauer et al. |
| 6,949,285 | B1 | * | 9/2005 | Tobinaga ......... B01D 69/148 428/317.9 |
| 7,662,517 | B2 | | 2/2010 | Lee et al. |
| 8,405,957 | B2 | | 3/2013 | Katayama et al. |
| 2002/0187401 | A1 | | 12/2002 | Lee et al. |
| 2003/0064282 | A1 | * | 4/2003 | Nakagawa ......... H01M 2/145 429/144 |
| 2003/0134968 | A1 | * | 7/2003 | Kang .................. C08F 230/08 524/588 |
| 2004/0101757 | A1 | * | 5/2004 | Kii ..................... H01M 2/1673 429/253 |
| 2004/0157118 | A1 | | 8/2004 | Uetani et al. |
| 2004/0224233 | A1 | * | 11/2004 | Chen .................... H01M 4/60 429/303 |
| 2005/0095504 | A1 | * | 5/2005 | Kim ................... H01M 2/1673 429/246 |
| 2005/0100794 | A1 | | 5/2005 | Chamberlain, II et al. |
| 2005/0271948 | A1 | | 12/2005 | Kang et al. |
| 2006/0263693 | A1 | | 11/2006 | Kim et al. |

FOREIGN PATENT DOCUMENTS

| | | | |
|---|---|---|---|
| EP | 1 667 253 B1 | 11/2010 | |
| EP | 1 860 712 B1 | 10/2012 | |
| JP | 10-154500 A | 6/1998 | |
| JP | 11-80395 A | 3/1999 | |
| JP | 2002-529891 A | 9/2002 | |
| JP | 2007-157723 A | 6/2007 | |
| KR | 10-2003-0059931 A | 7/2003 | |
| KR | 10-2006-0112822 B1 | 2/2006 | |
| KR | 10-2006-0072065 A | 6/2006 | |
| KR | 10-2006-0112822 A | 11/2006 | |
| KR | 10-2007-000231 A | 1/2007 | |
| WO | WO 2006/068428 A1 | 6/2006 | |
| WO | WO 2006068428 A1 * | 6/2006 | ............ H01M 2/166 |
| WO | WO 2006/112658 A1 | 10/2006 | |
| WO | WO 2007/066768 A1 | 6/2007 | |
| WO | WO 2007066967 A1 * | 6/2007 | ............. H01M 2/14 |

* cited by examiner

[Figure 1]
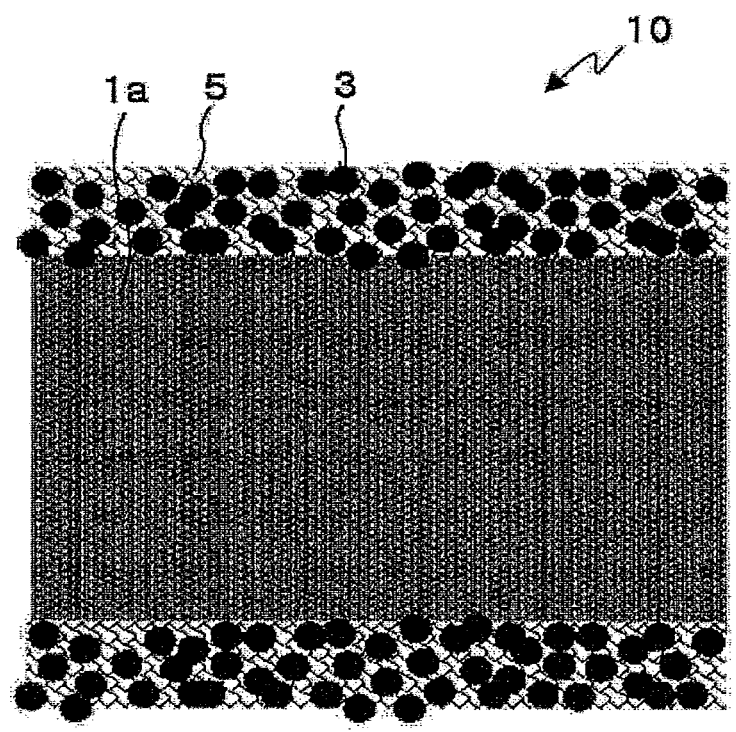

[Figure 2]
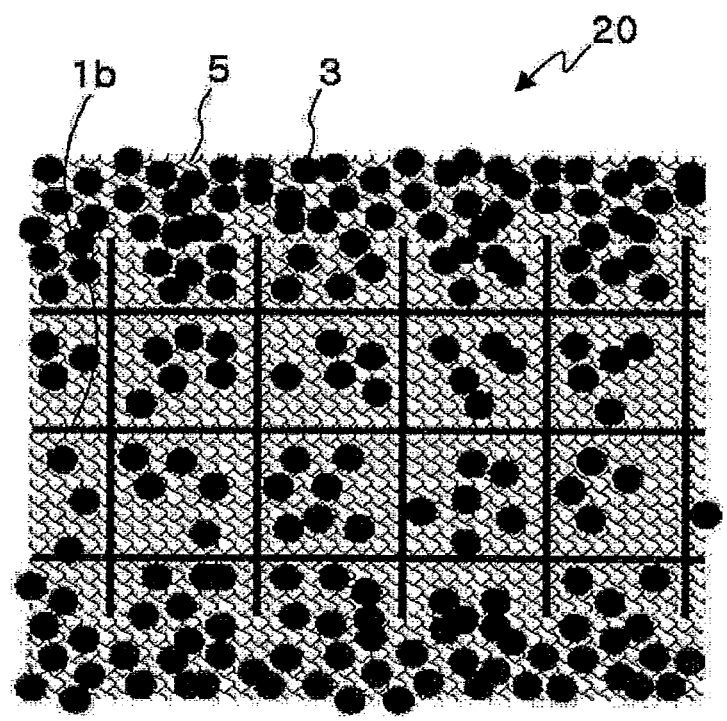

US 10,916,754 B2

SEPARATOR HAVING POROUS COATING LAYER, METHOD FOR MANUFACTURING THE SAME AND ELECTROCHEMICAL DEVICE HAVING THE SAME

CROSS-REFERENCE TO RELATED APPLICATIONS

This application is a Continuation of application Ser. No. 12/745,414, filed on Sep. 1, 2010, which was filed as PCT International Application No. PCT/KR2008/006944 on Nov. 25, 2008, which claims the benefit under 35 U.S.C. § 119(a) to Patent Application No. 10-2007-0122965, filed in Korea on Nov. 29, 2007, and to Patent Application No. 10-2008-0097364, filed in Korea on Oct. 2, 2008, all of which are hereby expressly incorporated by reference into the present application.

TECHNICAL FIELD

The present invention relates to a separator of an electrochemical device such as a lithium secondary battery and an electrochemical device having the same, and more particularly to a separator having a porous coating layer made of a mixture of inorganic particles and binder polymer and formed on a surface of a porous substrate and an electrochemical device having the same.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention, among which the development of a secondary chargeable/dischargeable battery is most interested.

Among currently used secondary batteries, lithium secondary batteries developed in early 1990's have a higher drive voltage and a much higher energy density than those of conventional batteries using a liquid electrolyte solution such as Ni-MH batteries, so the lithium secondary batteries have been advantageously used. However, a polyolefin porous substrate shows extreme thermal shrinking behavior at a temperature of 100° C. or above due to the features of its material and its manufacturing process such as elongation, so there may occur an electric short circuit between cathode and anode.

In order to solve the above safety-related problems of the electrochemical device, Korean Laid-open Patent Publication No. 10-2006-72065 and 10-2007-231 disclose a separator having a porous coating layer formed by coating at least one surface of a polyolefin porous substrate having many pores with a mixture of inorganic particles and a binder polymer. In such a separator, the inorganic particles in the porous coating layer formed on the polyolefin porous substrate act as a kind of spacer that keeps a physical shape of the porous coating layer, so the inorganic particles restrain thermal shrinkage of the polyolefin porous substrate when the electrochemical device is overheated. In addition, the inorganic particles prevent the cathode and the anode from being directly contacted even when the porous substrate is damaged.

As mentioned above, the porous coating layer formed on the porous substrate contribute to the improvement of thermal stability of an electrochemical, but the development of separators capable of improving thermal resistance of an electrochemical device further is continuously made. Also, there is demanded to develop a separator capable of improving high temperature cycle performance and discharge characteristics of an electrochemical device.

DISCLOSURE

Technical Problem

The present invention is designed in consideration of the above problems, and therefore it is an object of the invention to provide a separator capable of improving high temperature cycle performance and discharge characteristics of an electrochemical device due to increased impregnation and insolubility to electrolyte as well as controlling an electric short circuit between a cathode and an anode due to excellent thermal stability even when the electrochemical device is overheated. The present invention also provides a method for manufacturing the separator and an electrochemical device having the separator.

Technical Solution

In order to accomplish the above object, the present invention provides a separator, which includes a porous substrate having a plurality of pores; and a porous coating layer formed on at least one surface of the porous substrate and made of a mixture of a binder and a plurality of inorganic particles, wherein the binder includes a crosslinked binder.

In the separator of the present invention, the crosslinked binder may be crosslinked by means of reaction among binders selected from the group consisting of polymer having at least three reactive groups, low molecule having at least three reactive groups, or their mixtures, or may be obtained by crosslinking a binder selected from the group consisting of polymer having at least two reactive groups, low molecule having at least two reactive groups, or their mixtures, by using a crosslinking agent.

Also, in the separator of the present invention, the binder may be a mixture of a crosslinked binder and a non-crosslinked binder. The non-crosslinked binder may be any one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, or their mixtures.

In another aspect of the present invention, there is also provided a method for manufacturing a separator, which includes (S1) preparing a coating solution containing a crosslinkable binder component selected from the group consisting of a crosslinkable polymer, a crosslinkable low molecule, and their mixtures; (S2) adding inorganic particles to the coating solution such that the inorganic particles are dispersed in the coating solution; (S3) applying the coating solution in which the inorganic particles are dispersed to at least one surface of a porous substrate to form a coating layer; and (S4) crosslinking the crosslinkable binder component in the coating layer to form a porous coating layer.

In the method of the present invention, the crosslinkable binder component may be any one selected from the group consisting of polymer having at least three reactive groups, low molecule having at least three reactive groups, or their mixtures. Also, the coating solution may contain a crosslinking agent and a crosslinkable binder component selected from the group consisting of polymer having at least two reactive groups, low molecule having at least two reactive groups, or their mixtures.

Such a separator may be applied to an electrochemical device such as a lithium secondary battery or a super capacitor while being interposed between a cathode and an anode.

DESCRIPTION OF DRAWINGS

These and other features, aspects, and advantages of preferred embodiments of the present invention will be more fully described in the following detailed description, taken accompanying drawings. In the drawings:

FIG. 1 is a sectional view schematically showing a separator according to one embodiment of the present invention; and FIG. 2 is a sectional view schematically showing a separator according to another embodiment of the present invention.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

A separator of the present invention includes a porous substrate having a plurality of pores, and a porous coating layer formed on at least one surface of the porous substrate and made of a mixture of a binder and a plurality of inorganic particles. The binder includes a crosslinked binder. Since the binder configuring the porous coating layer includes a crosslinked binder, an impregnation ratio to electrolyte is improved, so discharge characteristics of an electrochemical device is improved according to the increase of ion conductivity. Also, due to the crosslinked binder, solubility of the binder to electrolyte is decreased, and accordingly stability of the coating layer is improved. In addition, the crosslinked binder improves dimensional stability of the porous coating layer, thereby contributing to improvement of high temperature performance and stability of the electrochemical device.

In the separator of the present invention, the crosslinked binder may be formed by reaction among polymer having at least three reactive groups, low molecule having at least three reactive groups, or their mixtures, or the crosslinked binder may be obtained by crosslinking polymer having at least two reactive groups, low molecule having at least two reactive groups, or their mixtures by using a crosslinking agent. The reactive group may be vinyl group, epoxy group, hydroxyl group, ester group, cyanate group and so on, which may react with heat or light, and the crosslinking agent may be a compound having at least three reactive groups, as mentioned above. Binder components and crosslinking agent components having reactive groups are exemplarily shown in the following chemical FIGS. 1 and 2.

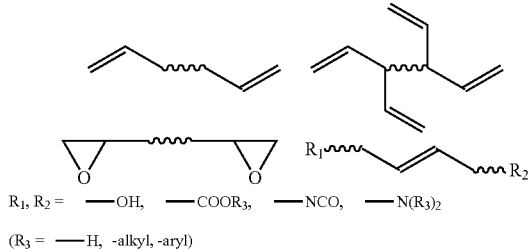

Chemical Formula 1

$R_1, R_2 =$ —OH, —COOR$_3$, —NCO, —N(R$_3$)$_2$ ($R_3 =$ —H, -alkyl, -aryl)

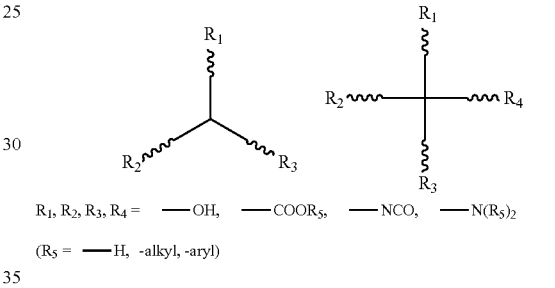

Chemical Formula 2

$R_1, R_2, R_3, R_4 =$ —OH, —COOR$_5$, —NCO, —N(R$_5$)$_2$ ($R_5 =$ —H, -alkyl, -aryl)

The crosslink structure may be formed by means of physical or chemical coupling. A binder having such a crosslink structure may be crosslinked polyethyleneoxide, crosslinked polypropyleneoxide, crosslinked polymethylmethacrylate, crosslinked polyvinylidenefluoride, crosslinked polyvinylidenefluoride-hexafluoropropylene copolymer, crosslinked polyacrylonitrile, crosslinked polysiloxane, crosslinked polyester, crosslinked polyurethane, crosslinked polyurea, crosslinked cellulose acetate, or a crosslinked binder having at least two of them. This binder preferably has a mean molecular weight of 10,000 g/mol.

Also, in the separator of the present invention, the binder configuring the porous coating layer may further include a non-crosslinked binder in addition to the crosslinked binder mentioned above. The non-crosslinked binder may employ polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide and so on, in single or in mixture.

In the separator of the present invention, the inorganic particle used for forming the porous coating layer is not specially limited if it is electrochemically stable. Namely, an inorganic particle usable in the present invention is not specially limited if oxidation or reduction reaction does not occur in an operating voltage range (for example, 0 to 5V based on Li/Li$^+$) of an applied electrochemical device. In particular, in case an inorganic particle with ion transferring capability is used, it is possible to enhance the performance by increasing ion conductivity in the electrochemical device.

In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles are selected from inorganic particles having a dielectric constant of 5 or above, preferably 10 or above, inorganic particles having lithium ion transferring capability, or their mixtures. The inorganic particle having a dielectric constant of 5 or above may be $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, and SiC, or their mixture, but not limitedly.

In particular, the inorganic particles such as $BaTiO_3$, $Pb(Zr,Ti)O$; (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$) show a high dielectric constant of 100 or above and have piezoelectricity since charges are generated to make a potential difference between both surfaces when a certain pressure is applied to extend or shrink them, so the above inorganic particles may prevent generation of an internal short circuit of both electrodes caused by an external impact and thus further improve the stability of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in a battery and also improve the performance of the battery. The inorganic particle having lithium ion transferring capability may be lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$) such as $14Li_2O-9Al_2O_3-38TiO_2-39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, and $P_2S_5$ type glass ($Li_xP_yS_z$, $0<x<3$, $0<y<3$, $0<z<7$) such as $LiI$—$Li_2S$—$P_2S_5$, or their mixture, but not limitedly.

In the separator of the present invention, the size of inorganic particles in the porous coating layer is not specially limited, but it is preferably in the range from 0.01 to 10 μm, if possible, in order to form a coating layer in a uniform thickness and ensure suitable porosity. If the particle size is less than 0.01 μm, a dispersing property is deteriorated, so it is not easy to control properties of the separator. If the particle size exceeds 10 μm, the thickness of the porous coating layer is increased, which may deteriorate mechanical properties. In addition, due to excessively great pore size, the possibility of internal short circuit is increased while charging or discharging a battery.

In the separator coated with the porous coating layer according to the present invention, a weight ratio of the inorganic particles and the crosslinked binder polymer of the porous coating layer is in the range from 50:50 to 99:1, more preferably from 60:40 to 95:5. The porous coating layer composed of inorganic particles and binder preferably has a thickness of 0.01 to 20 μm, but not limitedly. Also, pore size and porosity are not specially limited, but the pore size is preferably ranged from 0.01 to 10 μm and a porosity is preferably ranged from 5 to 90%.

The separator of the present invention may further include other additives as components of the porous coating layer, in addition to the inorganic particles and the polymer.

In addition, in the separator of the present invention, the porous substrate on which the porous coating layer is formed may adopt any kind of porous substrates commonly used for an electrochemical device, particularly a lithium secondary battery.

Referring to FIG. 1, the separator 10 of the present invention uses a polyolefin porous film 1a as a porous substrate, and a porous coating layer composed of inorganic particles 3 and a crosslinked binder 5 may be formed on one or both surfaces of the polyolefin porous film 1a. For example, the polyolefin porous film may be a membrane formed using polyolefin polymer containing polyethylene such as HDPE (high density polyethylene), LLDPE (linear low density polyethylene, LDPE (low density polyethylene) and UHMWPE (ultra high molecular weight polyethylene), polypropylene, polybutylene and polypentene, in single or in mixture.

In addition, as shown in FIG. 2, the separator 20 of the present invention uses a non-woven fabric 1b as a porous substrate, and a porous coating layer composed of inorganic particles 3 and a crosslinked binder 5 may be formed on one or both surfaces of the non-woven fabric 1b. For example, the non-woven fabric may be a non-woven fabric formed using polymer such as polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene and so on, in single or in mixture. In aspect of the structure of the non-woven fabric, melt-blown fabric or spun-bonded fabric composed of long fibers is preferred.

The thickness of the porous substrate is not specially limited, but the thickness is preferably 5 to 50 μm. Pore size and porosity of the porous substrate are also not specially limited, but the pore size is preferably 0.01 to 50 μm and the porosity is preferably 10 to 95%.

Now, a method for manufacturing a separator coated with a porous coating layer according to a preferred embodiment of the present invention is explained, but the present invention is not limited thereto.

First, a coating solution containing a crosslinkable binder component selected from the group consisting of crosslinkable polymer, crosslinkable low molecule, and their mixtures is prepared (S1).

As mentioned above, the crosslinkable binder component may adopt polymer having at least three reactive groups, low molecule having at least three reactive groups, or their mixtures. Also, the coating solution containing the crosslinkable binder component may include a crosslinking agent and a crosslinkable binder component selected from polymer having at least two reactive groups, low molecule having at least two reactive groups, or their mixtures. As necessary, the coating solution may be further added with a reaction catalyst or a crosslinking initiator such as a thermal initiator and a photo initiator.

In case only crosslinkable polymer is used for the crosslinkable binder component, the crosslinkable polymer is dissolved in a suitable solvent to prepare the coating solution. In case crosslinkable low molecule is included as the crosslinkable binder component, the crosslinkable polymer can be dissolved in the crosslinkable low molecule, so a solvent is not used.

The solvent preferably has a solubility parameter similar to that of the used crosslinkable polymer or the crosslinkable low molecule, and it also preferably has a low boiling point. Such a solvent will help uniform mixture and easy removal of the solvent afterward. A non-limiting example of usable solvent includes acetone, tetrahydrofuran, methylene chloride, chloroform, dimethylformamide, N-methyl-2-pyrrolidone (NMP), cyclohexane, water, and their mixtures.

Subsequently, inorganic particles are added to the prepared coating solution to make a coating solution in which inorganic particles are dispersed (S2).

After inorganic particles are added to the coating solution, it is preferred that the inorganic particles are pulverized. At this time, the time required for pulverization is suitably 1 to 20 hours, and the particle size of the pulverized particles is preferably 0.01 and 10 μm, as mentioned above. Conventional pulverization methods may be used, and a method using a ball mill is particularly preferred.

After that, the collating solution in which the inorganic particles are dispersed is applied to at least one surface of a porous substrate (S3).

In order to coat the porous substrate with the coating solution in which the inorganic particles are dispersed, a common coating method well known in the art may be used. For example, various methods such as dip coating, die coating, roll coating, comma coating or their combinations may be used. In addition, the porous coating layer may be formed selectively on either only one surface or both surfaces of the porous substrate.

Subsequently, the crosslinkable binder component in the coating layer is crosslinked to form a porous coating layer (S4).

The crosslinkable binder component may be crosslinked using a general curing method well known in the art. For example, in case the coating layer may be thermally cured, the crosslinkable binder component may be treated in an oven or a heating chamber at a temperature from normal temperature to 200° C., which allows batch-type or successive-type curing. Also, in case the coating layer may be cured by means of photoreaction, the crosslinkable binder component may be cured by irradiating light at a suitable temperature. In case condensates or byproducts occur during the curing process, the curing is preferably conducted under a reduced pressure, and a suitable pressure is 0.1 to 500 torr. A reduced temperature lower than 0.01 torr is not suitable for mass production, and a pressure condition over 500 torr does not allow easy removal of condensates or byproducts.

In case a solvent is added to the coating solution, a drying process for drying the coating layer is additionally required. As for the drying condition, an oven or heating chamber is used in a temperature range considering a vapor pressure of a used solvent, and this process may be executed in a batch type or a successive type.

The separator of the present invention, manufactured as above, may be used as a separator of an electrochemical device. Namely, the separator of the present invention may be usefully utilized as a separator interposed between a cathode and an anode.

The electrochemical device may be any device in which electrochemical reaction occurs, and specific examples of electrochemical devices include all kinds of primary batteries, secondary batteries, fuel cells, solar cells or capacitors such as super capacitor. In particular, among the secondary batteries, lithium secondary batteries including lithium metal secondary batteries, lithium ion secondary batteries, lithium polymer secondary batteries or lithium ion polymer secondary batteries are preferred.

The electrochemical device may be manufactured according to common methods well known to the art. For example, an electrochemical device may be manufactured by interposing the above separator between a cathode and an anode and then injecting an electrolyte solution therein. When the separator of the present invention is applied, a polyolefin porous film may be used together if necessary.

There is no special limitation in the electrodes that may be used together with the separator of the present invention, and the electrodes may be manufactured by settling electrode active materials on a current collector according to common methods well known in the art. Among the electrode active materials, a non-limiting example of cathode active materials may include any conventional cathode active materials currently used in a cathode of a conventional electrochemical device. Particularly, lithium manganese oxides, lithium cobalt oxides, lithium nickel oxides, lithium iron oxides or lithium composite oxides obtained by combining them are preferred as the cathode active materials. Also, a non-limiting example of anode active materials may include any conventional anode active materials currently used in an anode of a conventional electrochemical device. Particularly, lithium intercalation materials such as lithium metal, lithium alloys, carbon, petroleum coke, activated carbon, graphite or other carbonaceous materials are preferred as the anode active materials. A non-limiting example of a cathode current collector includes a foil formed with aluminum, nickel or a combination thereof. A non-limiting example of an anode current collector includes a foil formed with copper, gold, nickel, copper alloys or a combination thereof.

Electrolyte useable in the present invention includes a salt represented by the formula of $A^+B^-$, wherein $A^+$ represents an alkali metal cation selected from the group consisting of $Li^+$, $Na^+$, $K^+$, or combinations thereof, and $B^-$ represents an salt containing an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, or combinations thereof. The salt may be dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte useable in the present invention is not limited to the above examples.

The electrolyte may be injected at a suitable step during the manufacturing process of a battery, according to the manufacturing process and desired properties of a final product. In other words, the electrolyte solution may be injected before a battery is assembled or during a final step of the assembly process of a battery.

In order to apply the separator of the present invention to a battery, a stacking (or, laminating) process or a folding process may be used for the separator and the electrode in addition to a winding process that is most commonly used. In particular, when the separator of the present invention is applied to the stacking process among the above processes, thermal stability of an electrochemical device is remarkably improved. It is because a battery made using the stacking or folding process exhibits more severe thermal shrinkage of the separator rather than a battery made using a general winding process. Also, when the separator of the present invention is applied to the stacking or laminating process, easier assembling is ensured at a high temperature due to excellent thermal stability and adhesion of the crosslinked binder.

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Example 1

1-1. Preparation of Separator

A crosslinkable binder (TA10, 2 weight %) expressed by the following chemical formula 3 and AIBN (0.04% wt/wt) used as a crosslinking initiator were dissolved in acetone at 30° C. for 1 hour. Alumina powder with a mean particle diameter of about 1 μm was added to and dispersed in the solution such that the alumina powder has 20 weight % concentration with respect to the entire solid. After that, the mixture solution was applied to a polyethylene porous substrate (with porosity of 35%) having a thickness of about 20 μm by means of dip coating, and then cured and dried at the same time in a 90° C. drying oven for about 10 minutes. The finally formed coating layer was controlled to have a thickness of about 2 μm. As a result of measurement using a porosimeter, the porous coating layer formed on the polyethylene porous substrate had a pore size of 0.4 μm and porosity of 40%, respectively.

bonate (EC/PC/DEC=30:20:50 weight %) electrolyte in which 1M of lithiumhexafluorophosphate (LiPF) is dissolved was injected to the assembled battery to make a lithium secondary battery.

Example 2

A separator and a lithium secondary battery were manufactured in the same way as the example 1, except that a polyethyleneterephthalate non-woven fabric with a thickness of about 20 μm was used as a porous substrate. The made separator and porous coating layer had a pore size of 0.6 μm or less and porosity of about 55%.

Comparative Example 1

A separator and a lithium secondary battery were manufactured in the same way as the example 1, except that 2 weight % of PVdF-HFP was used instead of the crosslinkable binder and the crosslinking initiator. The made separator and porous coating layer had a pore size of 0.5 μm or less and porosity of about 42%.

Comparative Example 2

A separator and a lithium secondary battery were manufactured in the same way as the example 2, except that 2 weight % of PVdF-HFP was used instead of the crosslinkable binder and the crosslinking initiator used in the example 2. The made separator and porous coating layer had a pore size of 0.8 μm or less and porosity of about 58%.

For the batteries prepared according to the examples and the comparative examples, high temperature performance and high temperature stability were evaluated as follows.

Chemical Formula 3

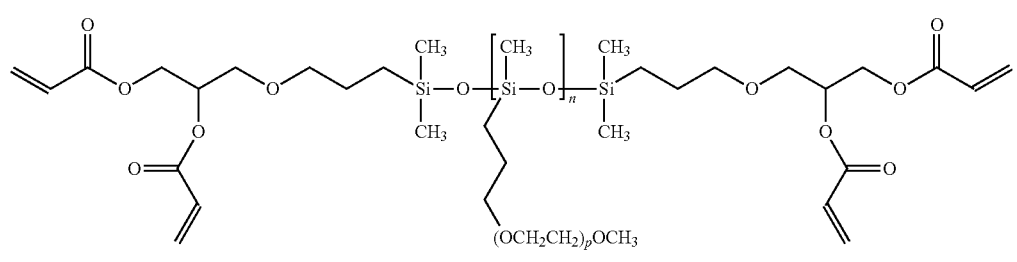

TA10 (n = 10, p = 3)

1-2. Manufacture of Lithium Secondary Battery 94 weight % of $LiCoO_2$ as a cathode active material, 3 weight % of carbon black as a conductive material, and 3 weight % of PVdF as a binding agent were added to N-methyl-2-pyrrolidone (NMP) as a solvent to make a cathode mixture slurry. The cathode mixture slurry was applied to an aluminum (Al) film with a thickness of 20 μm, which is a cathode current collector, and then dried to make a cathode.

96 weight % of carbon powder as an anode active material, 3 weight % of PVdF as a binding agent, and 1 weight % of carbon black as a conductive material were added to NMP as a solvent to make an anode mixture slurry. The anode mixture slurry was applied to a copper (Cu) film with a thickness of 10 μm, which is an anode current collector) and then dried to make an anode.

The prepared cathode, anode and separator were assembled in a stacking method to make a battery, and then 1M of ethylenecarbonate/propylenecarbonate/diethylcar- 60° C. Cycle Performance For each of the batteries prepared according to the examples and the comparative examples, 1C/1C charge/discharge cycle experiments were conducted at a high temperature of 60° C. Percentage values obtained by dividing capacities measured after 100, 200 and 300 cycles by an initial capacity are shown in the following table 1.

The batteries using the separator having a porous coating layer containing a crosslinked binder, manufactured according to the examples of the present invention, exhibits that a capacity is remarkably decreased as the number of charge/discharge cycles is increased, in comparison to the batteries prepared according to the comparative examples. It represents that the interface with an electrode keeps a stable state as thermal stability of the porous coating layer of the separator is increased due to the use of the crosslinked binder at a high temperature of 60° C., and thus high temperature performance is greatly improved.

TABLE 1

| Number of cycles | Example 1 | Example 2 | Comparative example 1 | Comparative example 2 |
|---|---|---|---|---|
| 100 cycles | 99% | 98% | 95% | 94% |
| 200 cycles | 97% | 95% | 91% | 90% |
| 300 cycles | 94% | 92% | 89% | 86% |

Discharge Characteristics (C-Rate)

The batteries prepared according to the examples and the comparative examples were cycled at discharge speed of 0.2C, 0.5C, 1C and 2C, respectively, at a normal temperature. Discharge capacities of the batteries are calculated into a percentage with respect to 0.2C capacity for each C-rate characteristic and then listed in the following table 2.

TABLE 2

| Discharge speed | Example 1 | Example 2 | Comparative example 1 | Comparative example 2 |
|---|---|---|---|---|
| 0.5 C | 99.3 | 99.2 | 99.6 | 96.8 |
| 1 C | 99.3 | 98.2 | 96.5 | 94.2 |
| 2 C | 95.8 | 93.7 | 88.0 | 86.8 |

It would be understood that the batteries using the separator having a porous coating layer containing a crosslinked binder, manufactured according to the examples of the present invention, exhibits that capacity decrease is very small as the discharge speed is increased, in comparison to the batteries prepared according to the comparative examples. It is considered that ion conductivity of batteries is improved since the porous coating layer containing a crosslinked binder increases a impregnation rate to electrolyte.

Hot Box Experiment

The batteries prepared according to the examples and the comparative examples are preserved at high temperature of 150° C. and 160° C. for 1 and 2 hours, respectively. The states of the batteries after the preservation are listed in the following table 3.

As seen from the table 3, the batteries of the comparative examples 1 and 2 exhibited explosion when being preserved for 2 hours at 160° C. However, the batteries of the examples 1 and 2 were safe though being preserved for 2 hours at 160° C. It means that thermal stability of the porous coating layer is greatly improved due to the crosslinked binder, and thus internal short circuit of cathode and anode is prevented though the batteries were preserved for a long time at a high temperature.

TABLE 3

| Condition | Example 1 | Example 2 | Comparative example 1 | Comparative example 2 |
|---|---|---|---|---|
| 150° C./1 hour | ○ | ○ | ○ | ○ |
| 150° C./2 hour | ○ | ○ | ○ | ○ |
| 160° C./1 hour | ○ | ○ | ○ | ○ |
| 160° C./2 hour | ○ | ○ | Firing/explosion | Firing/explosion |

INDUSTRIAL APPLICABILITY

The separator having a porous coating layer containing a crosslinked binder according to the present invention has insolubility against electrolyte and improved dimensional stability at a high temperature, so it may restrain a short circuit between a cathode and an anode even an electrochemical device is overheated and also improve high temperature cycle characteristics of the electrochemical device. In addition, since impregnation of the separator to electrolyte is increased, discharge characteristics is improved due to the improved ion conductivity.

The invention claimed is:

1. A method for manufacturing a separator, comprising:
   preparing a coating solution containing a crosslinkable binder component selected from the group consisting of a crosslinkable polymer, a crosslinkable molecule, and their mixtures, or containing a crosslinking agent and a crosslinkable binder component selected from the group consisting of polymer having at least two reactive groups, a molecule having at least two reactive groups, or their mixtures;
   adding inorganic particles to the coating solution such that the inorganic particles are dispersed in the coating solution;
   applying the coating solution in which the inorganic particles are dispersed to at least one surface of a porous substrate with a pore size of 0.01 to 50 μm and porosity of 10 to 95% to form a coating layer, wherein the porous substrate includes at least one of a polyolefin porous film and a non-woven fabric; and
   crosslinking the crosslinkable binder component in the coating layer at a reduced pressure of 0.1 to 500 torr to remove condensates or byproducts during the crosslinking, wherein a porous coating layer is formed with a thickness of 0.01 to 20 μm, made of a mixture of a binder and a plurality of inorganic particles, wherein the binder includes a crosslinked binder,
   wherein the crosslinked binder is formed by reaction among binders selected from the group consisting of a polymer having at least three reactive groups, a molecule having at least three reactive groups, and their mixtures, or the crosslinked binder is obtained by crosslinking a binder selected from the group consisting of a polymer having at least two reactive groups, a molecule having at least two reactive groups, and their mixtures by using a crosslinking agent,
   wherein the crosslinking agent is a compound having at least three reactive groups,
   wherein each of the reactive groups is selected from the group consisting of a vinyl group, an epoxy group, a hydroxyl group, an ester group, and a cyanate group,
   wherein a weight ratio of the inorganic particles and the crosslinked binder is 50:50 to 99:1, and
   wherein the crosslinked binder is selected from the group consisting of a crosslinked polymethylmethacrylate, a crosslinked polyvinylidenefluoride, a crosslinked polyvinylidenefluoride-hexafluoropropylene copolymer, a crosslinked polyester, a crosslinked polyurethane, a crosslinked polyurea, a crosslinked cellulose acetate and a crosslinked binder having at least two different crosslinked binders.

2. The method for manufacturing a separator according to claim 1,
   wherein the solvent is comprised of one or more of acetone, tetrahydrofuran, methylene chloride, chloroform, dimethylformamide, N-methyl-2-pyrrolidone (NMP), cyclohexane, water, and their mixtures.

* * * * *